United States Patent [19]
Hedgewick et al.

[11] 3,933,119
[45] Jan. 20, 1976

[54] TRIANGULAR SIGNALLING DEVICE

[75] Inventors: Peter Hedgewick, Windsor; Stewart H. Birrell, Clarkson, both of Canada

[73] Assignee: Reflex Corporation of Canada Limited, Windsor, Canada

[22] Filed: July 12, 1974

[21] Appl. No.: 488,081

Related U.S. Application Data

[63] Continuation of Ser. No. 273,250, July 19, 1972, abandoned, which is a continuation-in-part of Ser. No. 196,428, Nov. 8, 1971, abandoned, and a continuation-in-part of Ser. No. 163,734, July 19, 1971, abandoned.

[52] U.S. Cl. .............................. 116/63 P; 40/125 N
[51] Int. Cl.² ............................................... E01F 9/10
[58] Field of Search .......... 40/125 N, 125 H, 129 R; 94/1.5; 116/63 P, 125 R

[56] References Cited
UNITED STATES PATENTS

| | | | |
|---|---|---|---|
| 2,127,280 | 8/1938 | Zimbalist | 40/125 H |
| 2,835,219 | 5/1958 | Back | 40/125 N X |
| 3,593,681 | 7/1971 | Sernovitz | 116/63 P |
| 3,625,177 | 12/1971 | Miller | 40/125 N X |

FOREIGN PATENTS OR APPLICATIONS

| | | | |
|---|---|---|---|
| 1,126,516 | 7/1956 | France | 116/63 P |
| 1,124,659 | 7/1956 | France | 116/63 P |
| 1,125,120 | 7/1956 | France | 116/63 P |
| 985,881 | 3/1965 | United Kingdom | 116/63 P |
| 460,350 | 11/1950 | Italy | 116/63 P |

Primary Examiner—Louis G. Mancene
Assistant Examiner—John F. Pitrelli
Attorney, Agent, or Firm—Reising, Ethington, Barnard, Perry & Brooks

[57] ABSTRACT

A foldable triangular traffic signalling device including a collapsible body having first, second and third leg members connected together for movement between an erect triangle forming position in which each leg member constitutes one leg of a triangle and a folded position. One of the leg members has a pair of spaced sidewall members, and the other leg members each have an inner end received in the space between the sidewall members and pivotally connected to the sidewall member such that the other leg members can be folded and stored within the space between the sidewall members when the device is not in use. Light reflective means is provided on the outer surface of the leg members to define a triangular warning device when the leg members are in their erect position.

33 Claims, 18 Drawing Figures

TRIANGULAR SIGNALLING DEVICE

This is a continuation, of application Ser. No. 273-250, filed July 19, 1972 (now abandoned), the latter application in turn being a continuation-in-part of copending applications Ser. Nos. 163,734 (now abandoned) and 196,428 (now abandoned) filed July 19, 1971 and Nov. 8, 1971, respectively.

This invention relates generally to traffic warning and signalling devices, and is particularly concerned with triangular warning devices that can be conveniently stored in a vehicle in a collapsed or folded condition, and which can be easily erected and placed on a roadway in an upright position to warn approaching vehicles of a stalled vehicle or other obstruction or potentially dangerous situation.

The U.S. National Highway Safety Bureau has proposed a new safety standard, for both vehicles and equipment, that would require warning devices to be provided for passenger cars, multi-purpose passenger vehicles, trucks, and buses, and establish performance requirements for warning devices that in emergencies can be erected on or near the roadway to warn approaching drivers of the presence of a stopped vehicle. The proposed warning device is to have the configuration of an equilateral triangle covered on one or both faces with red reflex reflective material and orange flourescent material. The warning device must be foldable into a compact unit and must be constructed such that it can be erected from a folded condition and folded from an erect condition without the use of tools. When erected on or near a roadway to warn approaching drivers, the device will be subjected to high winds, and accordingly, the warning device is to be constructed so that it can maintain an erect position upon smooth concrete under the action of a forty mile per hour wind or more.

Foldable triangular signs and signalling devices are disclosed in U.S. Pat. No. 3,600,059; Canadian Pat. Nos. 678,800 and 696,573; French Pat. No. 1,128,096 and Australian Pat. 215,000. Collapsible signal devices of other than triangular configuration are disclosed in U.S. Pat. Nos. 2,062,479 and 3,056,377.

An object of this invention is to provide a collapsible or foldable triangular signalling device in which the components can all be snap-fitted together without the use of cement or adhesives.

A further object is to provide a collapsible or foldable triangular signalling device wherein one leg of the triangle may also be used to store the other two legs in the folded condition of the device.

A still further object is to provide a signalling device of triangular configuration wherein at least a portion of the legs of the triangle are covered with cube corner reflex reflectors and wherein the reflectors can be quickly and easily located on the legs of the triangle during manufacture.

A still further object is to provide a warning or signalling device of triangular configuration wherein a plurality of cube corner reflex reflector elements are secured to the legs of the triangle and are shaped so that they can be interchangeably mounted on either of the legs of the triangle to simplify the assembly and manufacture of the device.

A further object is to provide a warning device for use with stopped or disabled vehicles that can be erected on the roadway adjacent the vehicle and withstand high wind forces without collapsing from the erected position.

Still another object is to provide a portable, light weight warning device that can be erected on a roadway adjacent a disabled or stopped vehicle that has high resistance to being displaced or overturned by wind pressure.

Another object is to provide a foldable warning or signalling device of triangular configuration which, even in its folded condition, can serve as a reflective warning device, and which can be stored in its collapsed condition on a vehicle door or the like to provide a reflective warning device when the door is open.

In carrying out the foregoing, and other objects, a traffic signalling or warning device according to the present invention includes a body having first, second and third leg members connected together for movement between an erect, triangle forming position in which each leg member constitutes one leg of a triangle, and a folded position. One of the leg members is formed with a pair of spaced sidewall members, and the other two leg members each have one end received in the space between the sidewall members and pivotally connected thereto so that they can be folded into the space between the sidewall members. Interengageable means is provided on the foldable leg members for detachably securing the outer ends of the foldable leg members together in the erect position. Light reflective means is provided on at least one outer surface of each of the leg members.

The leg member having the spaced sidewalls is formed of a pair of complementary molded plastic shells which can be snap secured together to form an enclosure for receiving the other leg members in the folded position. The shells are formed with complementary inwardly tapered pin and tubular guide members so that the two shells can be fitted together by inserting the pins into the tubular guide members. The pivotal leg members are pivotally connected within the enclosure by pivot members that are snap-fitted onto the leg members and enclosure walls.

Support means is mounted on one of the leg members for supporting the device in an erect position on a roadway surface. The support means is movable between an active position for supporting the device in an erect position on a roadway surface, and an inactive, stored position adjacent one of the leg members. The support means includes a pair of support arms each of which has its inner end pivotally connected to one of the leg members such that it is pivotally movable with respect to the leg member between an extended active position to provide a wide support base and a retracted, stored position. In order to provide increased resistance to displacement or tipping from an erect, upright position on a roadway, the support arms are of heavy metal enclosed by an outer layer of plastic. Locking means is engageable between the support arms and the leg member to which the support arms are attached for restraining the support arms against movement from the active position caused by forces generated by wind pressure on the erect device. Sponge material is provided on the support arms and on the leg member on which the support arms are mounted for engaging the roadway surface and providing a resistance to movement along the roadway surface caused by wind pressure.

The light reflective means comprises a plurality of translucent plastic cube corner reflex reflector elements secured to the outer surfaces of the leg members. The reflector elements are shaped and arranged on the leg members to form a triangular configuration in the erect position of the leg members. In order to facilitate manufacture of the device, the reflector elements include three identical corner reflector elements and three identical elongated reflector elements for each surface of the device. In the erect position, the elongated elements each extend between an adjacent pair of the corner elements. Two of the corner reflector elements are secured to one leg member adjacent opposite ends thereof, and the third corner reflector element is secured to the outer end of one of the foldable leg members with each of the leg members having an elongated reflector element secured thereto. The reflector elements are each bounded by locating ribs projecting from the surface of the respective leg members to facilitate location of the reflector elements on the respective leg members. The reflector elements are secured to the reflective leg members by sonic welding which seals the reflector elements onto the plastic leg members of the triangle. consequently, the cube corner reflectors are not required to be metallized on their reverse faces so that optical efficiency is maintained.

In order to reduce the wind resistance of the erect device, a plurality of openings is formed in the leg members adjacent the reflector elements. In one version, the leg members have flat, planar outer surfaces adjacent the reflex reflector elements, and the openings comprise a series of elongated slots extending along the length of the leg members. In another version, the leg members have irregular or waffled outer surfaces adjacent the reflex reflector elements and a plurality of rows of openings extending both laterally and longitudinally along the width and length, respectively, of the leg members are provided to reduce wind resistance. In this version, the material of the leg members extending between adjacent pairs of the openings is of diamond configuration in cross-section. The material of the leg members may be fluorescent at least in the areas not covered by the reflector elements.

In summary, the present invention is embodied in (1) a warning or signalling device of triangular configuration having reflex reflector elements secured to an outer surface of the legs of the triangle, the reflex reflector elements being shaped and arranged to form a triangular configuration with each of the reflector elements bounded by ribs projecting from the surface of the leg member, and various of the reflector elements being of identical shape to be interchangeably mounted on the leg members, (2) a collapsible or foldable signalling device of triangular configuration in its erect position in which one of the leg members of the triangle forms an enclosure for receiving the other leg members in the collapsed or folded condition of the device, (3) a traffic warning or signalling device that can be erected on a roadway surface near a disabled or stopped vehicle to warn oncoming vehicles that has a foldable support means which provides high resistance to forces generated by wind pressure tending to displace or overturn the erect warning device and which can be conveniently folded to a stored position when the device is removed from the roadway surface, or (4) a collapsible or foldable traffic signalling device of triangular configuration having reflex reflector elements on the outer surface or surfaces of the legs of the triangle, and having a plurality of openings in at least some of the legs of the triangle to reduce the resistance of the device to wind pressure when it is erected on a roadway surface.

Other objects, advantages and features of the invention will become apparent from the following description taken in connection with the accompanying drawings in which.

Figure 1:
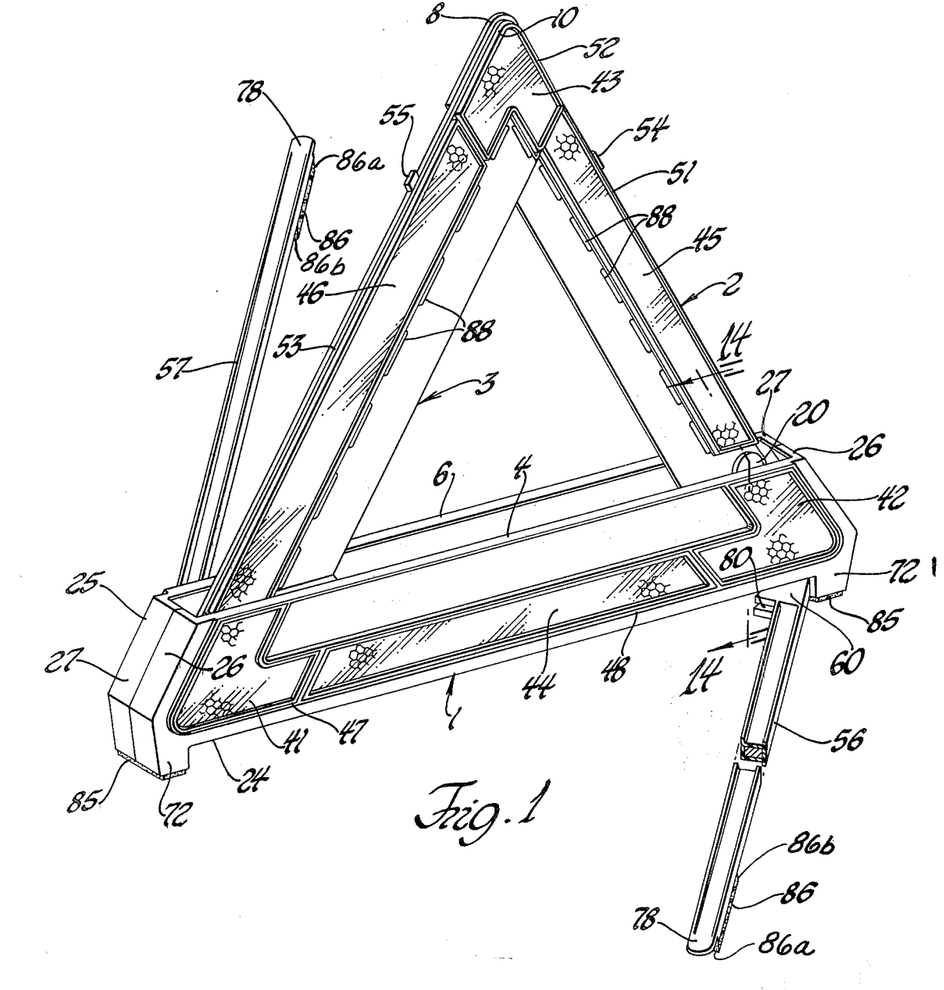
FIG. 1 is a perspective view of a foldable triangular traffic signalling device according to the invention with the device illustrated in its erect position.

Referring particularly to FIG. 1 of the drawings, reference numerals 1, 2 and 3 collectively designate first, second and third leg members of the collapsible body of a foldable triangular traffic signalling device according to the invention. As shown in FIG. 1, the first leg member 1 forms the base leg of the triangle, the second and third leg members 2 and 3, respectively, being of equal length to each other and to leg member 1 so that a traffic signalling device of equilateral triangular configuration is formed. As will be pointed out in greater detail hereinbelow, the leg members 1, 2 and 3 are connected together for movement between the erect, triangle forming position illustrated in FIG. 1 in which each leg member constitutes one leg of a triangle, and a folded position illustrated in full lines in FIG. 2.

Figure 2:
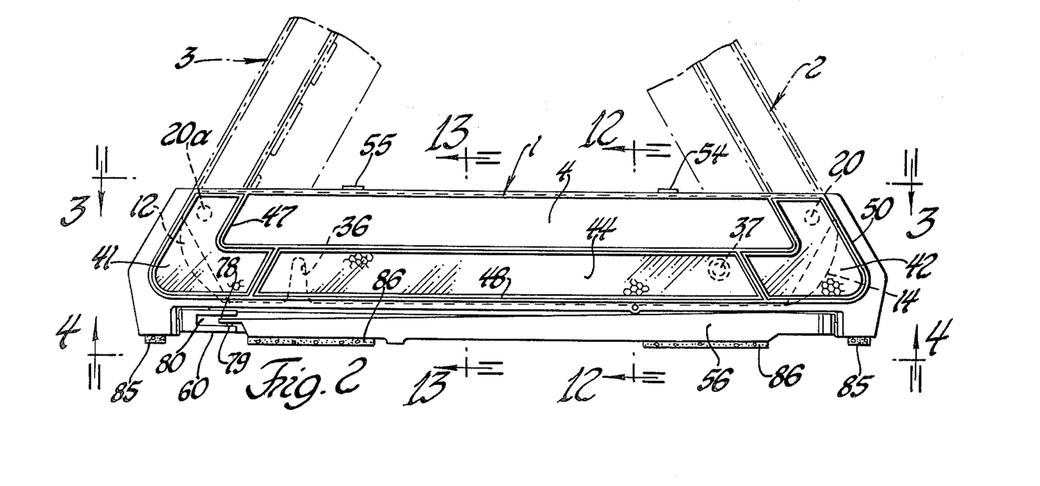
FIG. 2 is an elevational view of the device of FIG. 1 illustrated in its folded condition with the foldable leg members being illustrated in their erect position in phantom lines.
Figure 3:
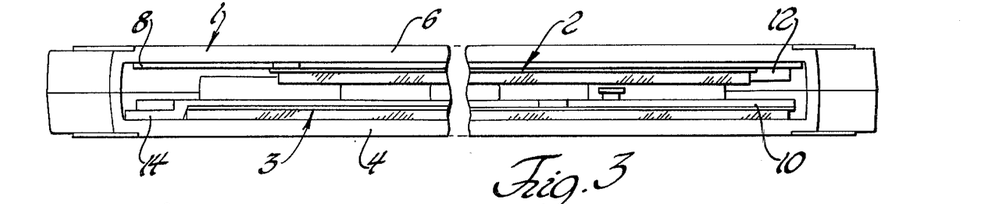
FIG. 3 is a top plan view taken on lines 3—3 of FIG. 2.
Figures 8, 9, 10, 11, 12, 13, 14:
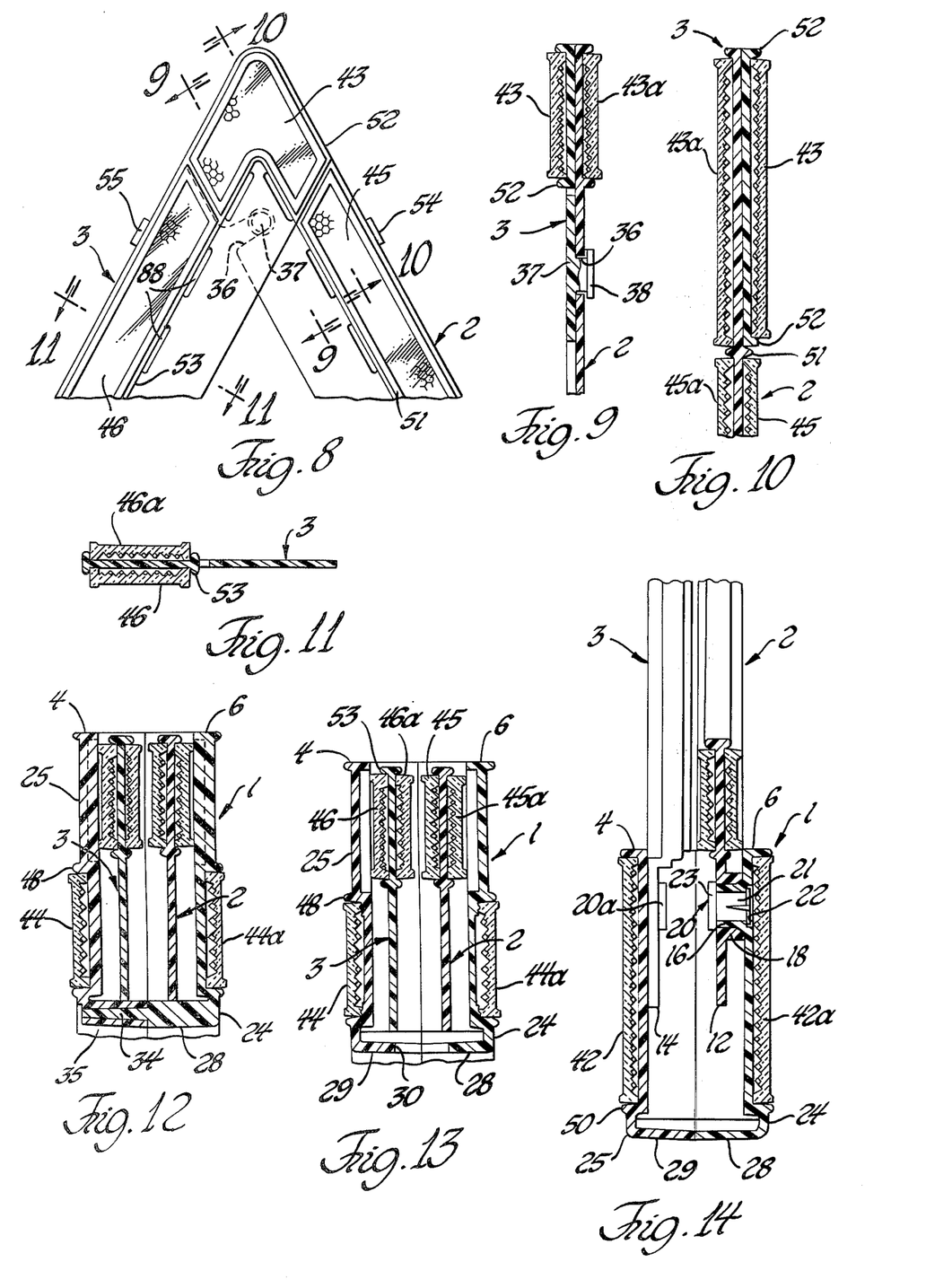
FIG. 8 is a slightly enlarged detailed view of the apex portion formed by the foldable leg members of the device.
FIG. 9 is a sectional view taken on lines 9—9 of FIG. 8.
FIG. 10 is a sectional view taken on lines 10—10 of FIG. 8.
FIG. 11 is a sectional view taken on lines 11—11 of FIG. 8.
FIG. 12 is a sectional view taken on lines 12—12 of FIG. 2.
FIG. 13 is a sectional view taken on lines 13—13 of FIG. 2.
FIG. 14 is a sectional view taken on lines 14—14 of FIG. 1.

The first or base leg member 1 has a pair of spaced sidewall members 4 and 6, and the second and third leg members 2 and 3 have inner ends 12 and 14, respectively, and outer ends 8 and 10, respectively. The inner ends 12 and 14 are received in the space between the sidewall members 4 and 6 and are pivotally connected at spaced locations to the sidewall members 4 and 6. Each of the second and third leg members 2 and 3 are thus pivotally movable with respect to the first leg member 1. Leg members 2 and 3 project angularly from the first leg member in the erect position shown in FIG. 1, and are received in the space between the sidewall members 4 and 6 in the folded position as shown in FIG. 2. As illustrated more clearly in FIG. 14, the sidewall member 6 is formed with an inwardly projecting hollow cylindrical bearing member 16, and the inner end 12 of the leg member 2 is formed with a hollow cylindrical sleeve member 18 which is rotatably mounted on the bearing member 16 so that the leg member 2 is pivotal about the axis of the bearing member 16 between the erect positions shown in FIG. 1 and the folded position shown in FIGS. 2, 3, 12 and 13. An expandible pivot fastener 20 prevents separation of the leg member 2 from the sidewall member 6. The expandible fastener 20 is of plastic material, and includes a split shank portion 21 which is resiliently radially compressible, a resiliently radially compressible end flange 22 and a head portion 23 (FIG. 14). The end flange 22, due to the radial resiliency of the split shank portion 21, can be pressed through the hollow bearing member 16 until the end flange 22 snaps outwardly to the position shown in FIG. 14 to axially secure the fastener 20 to the sidewall member 6. The head portion 23 projects radially outwardly from the shank portion and engages the leg member 2 as shown in FIG. 14 to prevent axial separation of the leg member 2 from the bearing member 16. The leg member 3 is secured to the sidewall member 4 in an identical manner by an expandible fastener 20a identical in construction to the fastener 20.

The base leg member 1 is made up of a pair of complementary shell members 24 and 25 secured together to form an enclosure for receiving the leg members 2 and 3 in the folded position. The sidewall members 4 and 6 constitute sidewalls of the shell members 24 and 25, respectively. The shell members 24 and 25 each further include end wall members 26 and 27, respectively, and bottom wall members 28 and 29, respectively (FIGS. 12, 13 and 14). Drain holes 30 are formed in the bottom wall members (FIG. 13). As shown in FIG. 12, inwardly projecting tapered pins 34 are formed on the shell member 24 and inwardly projecting complementary tubular guide members 35 are formed on the shell member 25 for frictionally receiving the pins 34. The shell members 24 and 25 are secured together by inserting the pins 34 into the corresponding guides 35.

The second and third leg members 2 and 3 are provided with interengaging means near their outer end 8 and 10, respectively, for detachably securing the outer ends together in the erect position of FIG. 1. The interengaging means includes a slot 36 formed in leg member 2 (FIGS. 8 and 9) and a pin 37 integrally molded onto leg member 3 and received in the slot 36. The pin 37 is formed with an enlarged head portion 38 on its outer end to prevent the leg members 2 and 3 from being separated along the axis of pin 37. When the pin 37 is received in the slot 36 as shown in FIGS. 8 and 9, the leg members 2 and 3 are secured in the erect position and extend angularly from the enclosure defined by the shell members 24 and 25.

Light reflective means is provided on at least one outer surface of each of the leg members 1, 2 and 3 and includes a plurality of translucent plastic, cube corner reflex reflector elements secured to corresponding outer surfaces of the leg members. In the illustrated embodiment, both outer surfaces of the leg members are provided with the reflex reflector elements. The reflex reflector elements are shaped and arranged on the leg members to form a triangular configuration in the erect position of the leg members. The reflector elements on one surface of the leg members, the surface visible in FIG. 1, include three identical V-shaped corner reflector elements 41, 42 and 43 for defining the triangle corners or apices, and three identical elongated reflector elements 44, 45 and 46, each of which extends between an adjacent pair of the corner elements in the erect position of the leg members. The first and second corner reflector elements 41 and 42 are secured to the outer surface of the first leg member 1 on the sidewall member 4 adjacent opposite ends of the leg member 1. One leg of each of the V-shaped corner elements is disposed in parallel relationship with the base leg 1, and the first elongated element 44 is secured to sidewall member 4 and extends therebetween. The other leg of the V-shaped corner element 41 projects in the direction of the erect leg member 3, and the other leg of the V-shaped corner element 42 projects in the direction of the erect leg member 2. A second elongated reflector element 45 is secured to the second leg member 2, and the third V-shaped corner reflector element 43 and the third elongated reflector element 46 are both secured to the third leg member 3. One leg of the V of corner element 43 extends in the direction of leg member 3, and the other leg of the V extends in the direction of leg member 2 when leg member 2 is erect. The illustrated reflector elements are formed of light transmitting synthetic resin material, and have smooth outer surfaces, the inner surfaces being formed with a plurality of cube corner reflex reflectors. Each of the reflector elements 41–46 are formed with an outwardly projecting peripheral flange surrounding the smooth outer surface, and an inwardly projecting peripheral flange surrounding the cube corner reflex reflectors and which seals against the surface of the respective leg members to maintain a space between the cube corner reflectors and the surface of the leg member. The elongated reflector elements 44, 45 and 46 in the illustrated embodiment are of trapezoidal shape in plan with the longer edges constituting the outside edges of the reflective triangle.

Each of the leg members 1, 2 and 3 is formed with outwardly projecting locating ribs, and each of the reflector elements is bounded by the locating ribs for ease of assembly of the reflector elements to the leg members. Thus, the corner reflector element 41 is bounded by an outwardly projecting rib 47 which extends around the entire periphery of the reflector element 41 to define a recess for receiving the reflector element 41. Similarly, the elongated reflector element 44 is surrounded by an outwardly projecting rib 48 which extends around the entire periphery of the reflector element 44 and defines a recess for receiving the reflector element 44. The corner reflector element 42 is surrounded by a rib 50 which extends around the periphery of the reflector element 42 and defines a recess for receiving the reflector element 42. Similarly, the reflector element 45 is surrounded by an outwardly projecting rib 51 molded onto leg member 2, and the reflector elements 43 and 46 are surrounded by ribs 52 and 53 molded into the leg member 3. In the illustrated embodiment, the opposite faces of the respective leg members are also provided with identical reflector elements 41a through 46a corresponding respectively with the reflector elements 41 through 46. The reflector element 43a corresponding to the corner reflector element 43 is located on leg member 2, and the corresponding face of leg member 3 is provided with only the single elongated reflector element 46a.

The reflector elements are secured to the surfaces of the respective leg members by sonic welding or the like to seal the reflector elements onto the plastic leg members 1, 2 and 3.

The leg members 2 and 3 are formed with outwardly extending tabs 54 and 55, respectively, that can be grasped to assist in unfolding the legs from the collapsed position of FIG. 2.

For supporting the device in an erect position on a roadway, support means is mounted on the leg member 1 for movement between an active supporting position and an inactive stored position. The support means includes a pair of support arms 56 and 57 each having its inner end pivotally connected to the bottom wall of the leg member 1. The support arms 56 and 57 are pivotally movable with respect to the leg member 1 between the extended active position shown in FIG. 1 and an inactive stored position illustrated in FIGS. 2, 4 and 5.

Figure 6:
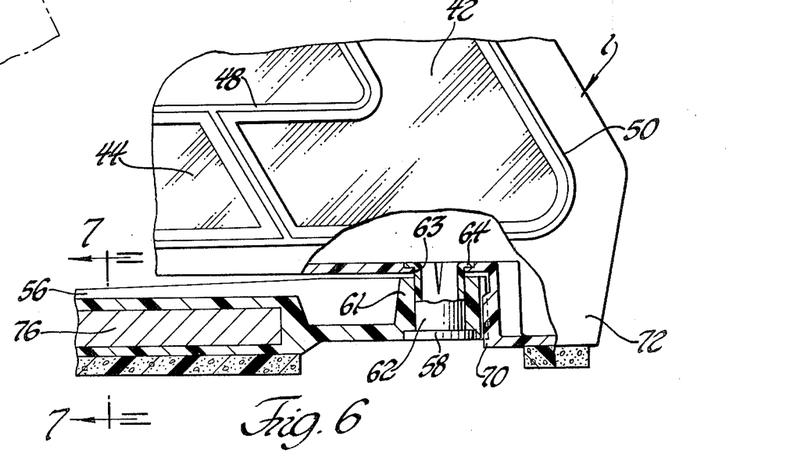
FIG. 6 is an enlarged detail view, partially in section, of the device of FIG. 1.

As shown in FIG. 6, the support arm 56 is pivotally secured to the bottom wall of the leg member 1 by an expandable fastener 58. The support arm 56 is formed with a mounting portion 60 having a cylindrical sleeve portion 61 which rotatably receives the split shank 62 of the fastener 58. The fastener 58 has a radially outwardly extending end flange 64 which, due to the radial resiliency of the split shank 62, can be pressed through an opening 63 in the bottom wall of the leg member until the end flange 64 snaps outwardly to secure the fastener in place. The fastener 58 is of similar construction to the fasteners 20 and 20a.

Figure 5:
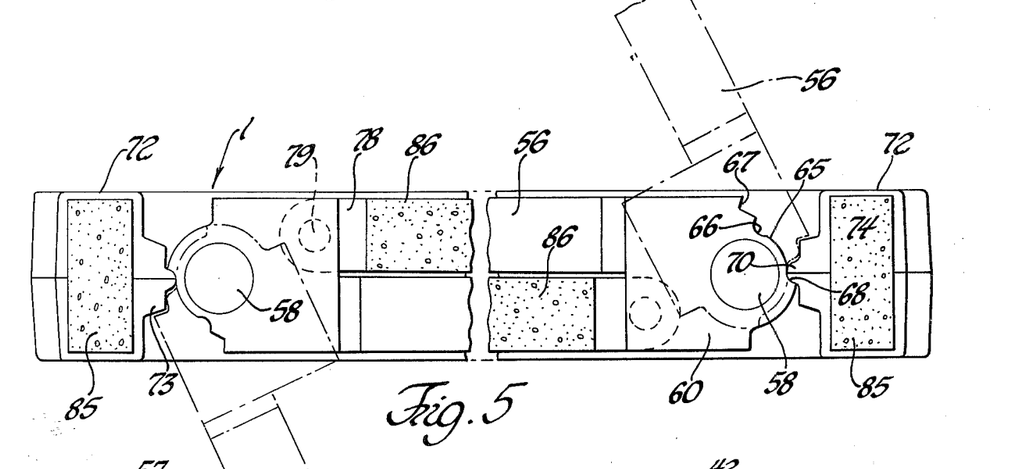
FIG. 5 is a view similar to FIG. 4, slightly enlarged, illustrating the parts in different positions in phantom lines.

The device is provided with locking means for restraining the support arms 56 and 57 against movement from the active position illustrated in full lines in FIG. 1 and in phantom lines in FIG. 5. The locking means includes a cam surface 65 formed on the mounting portion 60, a groove 66 formed in the cam surface 65, and spaced stop shoulders 67 and 68 formed on the mounting portion 60. The locking means further includes a pair of posts 72 projecting downwardly from opposite ends of the leg member 1 and cooperable with the cam portion 65 of the support arms. The posts 72 are each formed with a projection 70 resiliently engaged with the cam surface 65. In the inactive or retracted position of the support arm 56, the projection 70 engages the stop shoulder 68 as shown in FIG. 5. When the support arm 56 is moved to the extended active position as illustrated in phantom lines in FIG. 5, the cam surface 65 slides along the projection 70 until the projection 70 resiliently snaps into the groove 66 as the support arm 56 reaches the phantom line position shown in FIG. 5. The post 72 is also formed with a ledge or corner portion 74 which engages the stop shoulder 67 to limit the travel of the support arm 56 in the extended direction. Since the locking means including the posts 72 and mounting portion of support arm 57 is identical, it will not be described in detail.

Figure 4:
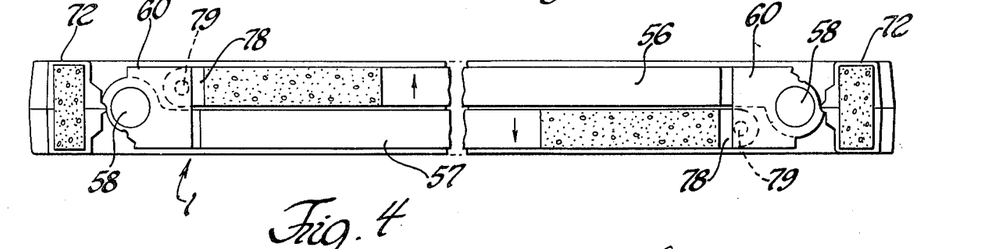
FIG. 4 is a bottom plan view taken on lines 4—4 of FIG. 2.
Figure 7:
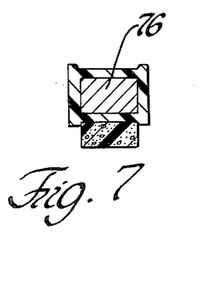
FIG. 7 is a sectional view taken on lines 7—7 of FIG. 6.

The support arms 56 and 57 are of molded plastic construction having a metal core 76 (FIGS. 6 and 7) to add weight and stability to the warning device in the erect position as shown in FIG. 1. The metal core 76 is completely encased in the plastic material and may be of steel or other heavy material. The outer ends of the support arms are formed with tongue portions 78 which are receivable in slots 80 formed in the mounting portions 60 of the opposite support arms. The tongue portions 78 are each formed with a projection 79 on the lower surface for frictional engagement with one wall of the slot 80 when received in the slot 80 to frictionally maintain the support arms 56 and 57 in their stored positions as illustrated in FIG. 4.

Pads 85 of sponge rubber or similar material are secured to the bottom of the posts 72, and pads 86 of sponge rubber or similar material are secured to the support arms 56 and 57 on their underneath sides adjacent the outer ends thereof. The pads 86 each have leading ends 86a adjacent the respective ends of the arms 56 and 57 from which the tongue portions 78 project, and extend inwardly along the lengths of the arms to trailing ends 86b, as illustrated in FIG. 1. The sponge rubber material provides high resistance to sliding movement of the device under the action of high winds and adds to the stability of the erect device.

As shown in FIG. 1, the leg members 1, 2 and 3 of the triangular body are each wider than the respective elongated reflector elements 44, 45 and 46. The leg members, adjacent the respective elongated reflector elements, have flat, planar outer surfaces. Wind pressure against one face of the device tends to create vacuum pressure on the opposite face and the resultant force tends to overturn the device. For example, when the wind direction is toward the face of the device having the reflector elements 44, 45 and 46, or toward the face of the device visible in FIG. 1, a vacuum pressure tends to form on the opposite face due to the air flow around the leg members. In order to reduce this tendency of a vacuum pressure forming on the face of the device opposite the face exposed to the wind pressure, a plurality of openings 88 are provided in the second and third leg members 2 and 3 adjacent the reflector elements 45 and 46. The openings 88 in the FIG. 1 embodiment comprise a series of elongated slots extending along the length of the leg members 2 and 3. Consequently, the wind passing through the slots 88 reduces the amount of vacuum pressure that can form on the face of the device opposite the face exposed directly to the wind pressure.

As pointed out above, the device is shown in its folded position in full lines in FIG. 2. In order to unfold the device and set it up in its erect position on a roadway surface, the tabs 54 and 55 may be grasped to pivot the leg members 2 and 3 about their respective pivot pins or fasteners 20 and 20a. The leg members are manipulated about the pivot members 20 and 20a until the pin 37 is inserted into the slot 36 as illustrated in FIG. 8. The support means is moved to its active position by pivoting the support arms 56 and 57 outwardly from beneath the base leg member 1 to the position illustrated in FIG. 1. As pointed out previously, the projection 70 is resiliently biased into engagement with the cam surface 65 so that it snaps into the groove 66 with a detent action when the leg member 56 reaches its active position. The detent action provides high resistance to movement of the leg member from its extended position under the action of wind pressure and hence provides high resistance to collapse of the device under wind pressure.

When the device is in the erect position as shown in FIG. 1 on a roadway adjacent a stalled vehicle or the like, wind pressure against the face visible in FIG. 1 increases the pressure between pad 86 on the support arm 57 which in turn increases the frictional resistance between pad 86 of support arm 57 and the roadway surface to provide high resistance to sliding movement of the device.

The leg members 1, 2 and 3 are all of molded plastic material, and preferably are of orange, fluorescent molded plastic material.

Figure 15:
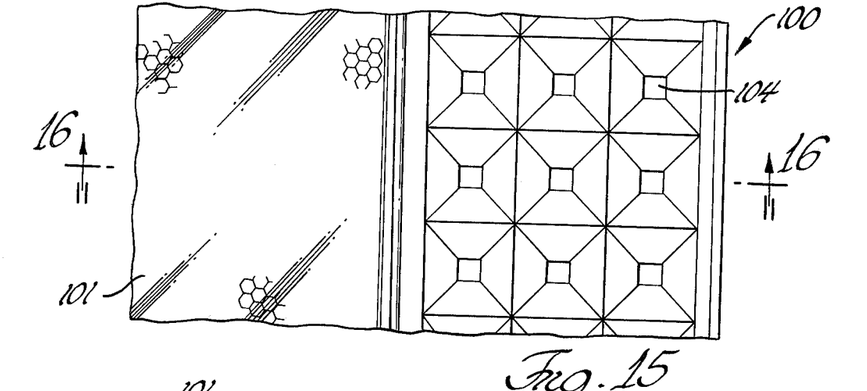
FIG. 15 is an enlarged, fragmentary elevational view of a modified version of the invention.
Figures 16, 17, 18:
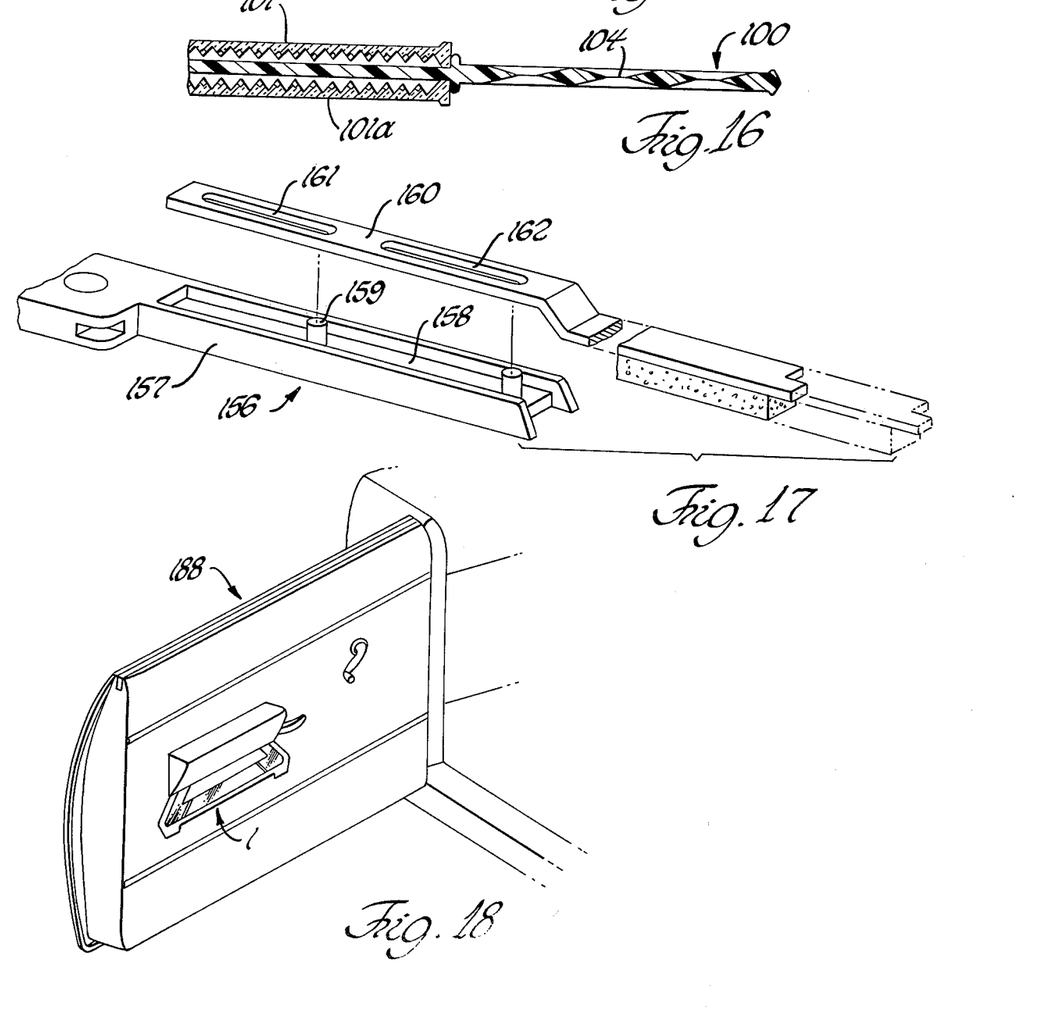
FIG. 16 is a sectional view taken on lines 16—16 of FIG. 15.
FIG. 17 is a perspective view of a modified support arm for a traffic signalling device according to the invention.
FIG. 18 is a perspective view of a typical vehicle door with the folded signalling device according to the invention stored thereon.

FIGS. 15 and 16 illustrate a second embodiment of the invention wherein the leg members, at least the leg members corresponding to leg members 2 and 3 of the device of FIG. 1, are of waffled configuration in the areas adjacent to the areas in which the reflector elements are mounted. FIG. 15 illustrates a portion of a leg member 100 corresponding to one of the leg members 2 and 3 of the device of FIG. 1 having cube corner reflex reflector elements 101 and 101a secured to opposite sides of the leg member. The area adjacent to the reflector elements 101 and 101a is molded into a waffled configuration having a plurality of openings 104 for reducing wind resistance. The plurality of openings consist of horizontal and transverse rows of openings 104, and as illustrated in FIG. 16, the material between adjacent pairs of the openings in the transverse rows is of diamond configuration. The openings 104 serve the same function as the openings or slots 88 in the embodiment of FIG. 1.

FIG. 17 illustrates a modified version of a support arm corresponding to the support arm 56 or 57 of the embodiment of FIG. 1. The support arm 156 in FIG. 17 is extensible and includes a stationary portion 157 which is pivotally mounted to the base leg member of the triangular device, and an extensible leg portion 160. The stationary leg portion 157 is formed with an elongated groove 158 and a pair of pins 159. The extensible leg portion 160 is formed with a pair of elongated slots 161 and 162 each of which receives one of the pins 159. When the support arm 156 is swung outwardly from its stored position beneath the base leg of the triangle, the extensible portion 160 can be extended outwardly to increase the length of the support arm and hence increase the stability of the erect warning device.

FIG. 18 illustrates a typical car door 188 wherein the warning device in its folded position is stored on the door in a recess or the like formed on the inside of the door such that when the door is opened, the base leg 1 of the triangle with its reflector elements are visible to traffic approaching from the rear of the vehicle to warn the approaching drivers.

While specific embodiments of the invention have been disclosed in the accompanying drawings and described in the foregoing specification, it should be understood that the invention is not limited to the exact construction shown. Alterations in the construction and arrangement of parts, all falling within the scope and spirit of the invention, will be apparent to those skilled in the art.

We claim:

1. A foldable triangular traffic signalling device comprising: a collapsible body having first, second and third leg members connected together for movement between an erect triangle forming position in which each leg member constitutes one leg of a triangle and a folded position; said first leg member having a pair of spaced side wall members; said second and third leg members each having an inner end and an outer end with said inner ends being received in the space between said side wall members and pivotally connected at spaced locations to said side wall members such that each of said second and third leg members is pivotally movable with respect to said first leg member and projects angularly from said first leg member in said erect position and is received in the space between said side wall members in said folded position; interengaging means near said outer ends of said second and third leg members for detachably securing said outer ends together in said erect position; light reflective means on at least one outer surface of each of said leg members; said first leg member comprising a pair of complementary shell members secured together to form an enclosure for receiving said second and third leg members in the folded position, each of said side wall members defining a side wall of one of said shell members; said shell members each further including end wall members projecting inwardly from the opposite end edges of the associated side wall member, and a bottom wall member projecting inwardly from the bottom edge of the associated side wall member; one of said shell members being formed with inwardly projecting tapered pins and the other of said shell members being formed with complementary tubular guide members receiving said pins; including support means mounted on said first leg member for movement between an active position to support said leg members upright in their erect position and an inactive stored position, said support means including a pair of support arms each having its inner end pivotally connected to said first leg member such that each support arm is pivotally movable with respect to said first leg member between an extended active position and a retracted, inactive position, said support means further including locking means engaged between said support arms and said first leg member for restraining said support arms against movement from their active positions, said locking means comprising grooves and projections on said support arms and first leg member, said projections being resiliently received in the respective grooves when the respective support arms are in the extended position.

2. A device as claimed in claim 1 wherein said support means further includes a pair of spaced support posts projecting from the bottom wall members of said first leg member, said projections being located on said support posts, and said grooves being located on said support arms.

3. A device as claimed in claim 2 wherein said support arms each comprise elongated hollow plastic members with a metal core to add weight to the support arms and increase the stability of the leg members in the upright, erect position.

4. A device as claimed in claim 3 further including pads of sponge rubber or the like on the underneath sides of the outer ends of said support arms and on said support posts.

5. A device as claimed in claim 3 wherein said light reflective means comprises a plurality of translucent plastic reflector elements secured to the corresponding outer surfaces of said leg members and including three identical corner reflector elements for defining triangle corners and three identical elongated reflector elements each extending between and adjacent pair of corner elements in the erect position of said leg members.

6. A device as claimed in claim 5 wherein: first and second of said corner reflector elements are secured to the outer surface, said first leg member adjacent opposite ends thereof, and a first one of the elongated reflector elements secured to said outer surface of said first leg member and extending between said first and second corner reflector elements; a second elongated reflector element is secured to said second leg member; and the third corner reflector element and the third elongated reflector element is secured to said third leg member such that in the erect position of said leg members said second elongated reflector element extends between said second and third corner reflector elements and said third elongated reflector element extends between said first and third corner reflector elements.

7. A device as claimed in claim 6 wherein each of said reflector elements is bounded by locating ribs projecting from the outer surface of the respective leg members.

8. A foldable triangular traffic signalling device comprising: a collapsible body having first, second and third leg members connected together for movement between an erect triangle forming position in which each leg member constitutes one leg of a triangle and a folded position; said first leg member having a pair of spaced side wall members; said second and third leg members each having an inner end and an outer end with said inner ends being received in the space between said side wall members and pivotally connected at spaced locations to said side wall members such that each of said second and third leg members is pivotally movable with respect to said first leg member and projects angularly from said first leg member in said erect position and is received in the space between said side wall members in said folded position; interengaging means near said outer ends of said second and third leg members for detachably securing said outer ends together in said erect position; light reflective means on at least one outer surface of each of said leg members; said light reflective means comprising a plurality of translucent plastic reflector elements secured to corresponding surfaces of said leg members, said reflector elements being shaped and arranged on the leg members to form a triangular configuration in the erect position of said leg members; said plurality of reflector elements including three identical corner reflector elements for defining triangle corners, and three identical elongated reflector elements each extending between an adjacent pair of corner elements in the erect position of said leg members; and wherein first and second of said corner reflector elements are secured to the outer surface of said first leg member adjacent opposite ends thereof, and a first one of the elongated reflector elements is secured to said outer surface of said first leg member and extends between said first and second corner reflector elements; a second elongated reflector element is secured to said second leg member; and the third corner reflector element and the third elongated reflector element is secured to said third leg member such that in the erect position of said leg members said second elongated reflector element extends between said second and third corner reflector elements and said third elongated reflector element extends between said first and third corner reflector elements; and wherein each of said reflector elements is bounded by locating ribs projecting from the outer surface of the respective leg members; and wherein said leg members are each wider than said elongated reflector elements, and further including a plurality of openings through the portion of said second and third leg members adjacent said second and third reflector elements, respectively, for reducing wind resistance of the erect leg members.

9. A device as claimed in claim 8 wherein said second and third leg members have flat, planar outer surfaces adjacent their respective elongated reflector elements, and said openings comprise a series of elongated slots extending along the length of said second and third leg members.

10. A device as claimed in claim 9 wherein said leg members are composed of fluorescent material at least in the areas not covered by said reflector elements.

11. A device as claimed in claim 8 wherein said second and third leg members are waffled adjacent their respective elongated reflector elements, and said openings comprise a plurality of rows of openings extending both laterally and longitudinally along the widths and lengths, respectively, of said second and third leg members.

12. A device as claimed in claim 11 wherein the material of said second and third leg members extending between adjacent pairs of said openings is of diamond configuration in cross-section.

13. A device as claimed in claim 12 wherein said leg members are composed of fluorescent material at least in the areas not covered by said reflector elements.

14. A foldable triangular signalling device comprising: a collapsible body having first, second and third leg members connected together for movement between an erect triangle forming position in which each leg member constitutes one leg of a triangle, and a folded position; said second and third leg members each having an inner end and an outer end; means pivotally connecting the inner ends of said second and third leg members to said first leg member, said means comprising a pair of spaced cylindrical bearing members projecting from said first leg member, each of said bearing members having an opening extending therethrough; a hollow sleeve member formed on the inner end of each of said second and third leg members, each of said hollow sleeve members being rotatably received on one of said bearing members, and a pair of expandable pivot fasteners each axially securing one of said sleeve members to the bearing member in which it is mounted, said fasteners each including a split, resiliently radially compressible shank portion, a resiliently radially compressible end flange on one end of said shank portion and an enlarged head portion on the other end of said shank portion, said shank portion being received in said bearing member with said end flange projecting radially outwardly of one end of the bearing opening to axially secure said fastener to said bearing member and the head portion projecting radially outwardly of the other end of said bearing opening and said sleeve member to axially secure said sleeve member to said bearing member, and interengaging means on the outer ends of said second and third leg members for securing said outer ends together in said erect position.

15. A device as claimed in claim 14 further including support means mounted on said first leg member for movement between an active position to support said leg members upright in their erect position and an inactive stored position.

16. A device as claimed in claim 15 further including locking means on said support means for restraining said support means against movement from its active position.

17. A device as claimed in claim 16 wherein said support means includes a pair of support arms each having its inner end pivotally connected to said first leg member such that each support arm is pivotally movable with respect to said first leg member between an extended active position and a retracted, inactive position.

18. A device as claimed in claim 17 wherein each of said support arms is formed with a mounting portion having a cylindrical sleeve portion with an opening extending therethrough, and wherein said first leg member has a pair of spaced openings therein, said mounting portions being pivotally secured to said first leg member by a pair of pivot fasteners each extending through one of said sleeve portions and one of said openings, each of said pivot fasteners comprising a split, resiliently radially compressible shank portion, a resiliently radially compressible end flange on one end of said shank portion and an enlarged head portion on the other end of said shank portion, said shank portion being received in the cylindrical sleeve portion of one of said support arms as well as one of the openings in said first leg member with said end flange projecting radially outwardly of said opening and said head portion projecting radially outwardly of said sleeve portion.

19. A device as claimed in claim 18 wherein said support arms each comprise elongated hollow plastic members with a metal core to add weight to the support arms and increase the stability of the leg members in the upright, erect position.

20. A device as claimed in claim 29 further including pads of sponge rubber or the like on the underneath sides of said support arms near the outer ends thereof for engaging the road surface.

21. A device as claimed in claim 14 including light reflective means on at least one outer surface of each of said leg members.

22. A device as claimed in claim 21 wherein said light reflective means comprises a plurality of translucent plastic reflector elements secured to corresponding surfaces of said leg members, said reflector elements being shaped and arranged on the leg members to form a triangular configuration in the erect position of said leg members.

23. A device as claimed in claim 22 wherein said plurality of reflector elements includes three identical corner reflector elements for defining triangle corners, and three identical elongated reflector elements each extending between an adjacent pair of corner elements in the erect position of said leg members.

24. A device as claimed in claim 23 wherein: first and second of said corner reflector elements are secured to the outer surface of said first leg member adjacent opposite ends thereof, and a first one of the elongated reflector elements is secured to said outer surface of said first leg member and extends between said first and second corner reflector elements; a second elongated reflector element is secured to said second leg member; and the third corner reflector element and the third elongated reflector element is secured to said third leg member such that in the erect position of said leg members said second elongated reflector element extends between said second and third corner reflector elements and said third elongated reflector element extends between said first and third corner reflector elements.

25. A device as claimed in claim 24 wherein each of said reflector elements is bounded by locating ribs projecting from the outer surface of the respective leg members.

26. A device as claimed in claim 25 wherein said leg members are each wider than said elongated reflector elements, and further including a plurality of openings through the portion of said second and third leg members adjacent said second and third reflector elements, respectively, for reducing wind resistance of the erect leg members.

27. A device as claimed in claim 26 wherein said second and third leg members have flat, planar outer surfaces adjacent their respective elongated reflector elements, and said openings comprise a series of elongated slots extending along the length of said second and third leg members.

28. A device as claimed in claim 27 wherein said second and third leg members are waffled adjacent their respective elongated reflector elements, and said openings comprise a plurality of rows of openings extending both laterally and longitudinally along the widths and lengths, respectively, of said second and third leg member.

29. A triangular traffic signalling device comprising: a triangular body having first, second and third leg members each constituting one leg of a triangle; light reflective means on at least one outer surface of each of said leg members, and support means mounted on said body for supporting said body upright on a roadway surface or the like, said support means including a pair of support arms each having one of its inner ends pivotally connected to one of said leg members such that each support arm is pivotally movable between an extended active position and a retracted inactive position, locking means engaged between said support arms and one leg member for restraining said support arms against movement from their active positions, said locking means comprising grooves and projections on said support arms and one leg member, said projections being resiliently received in the respective grooves when the respective support arms are in the extended position; and wherein said support means further includes a pair of spaced support posts projecting from said one leg member, said projections being located on said support posts, and said grooves being located on said support arms.

30. A device as claimed in claim 29 wherein said support arms each comprise elongated hollow plastic members with a metal core to add weight to the support arms and increase the stability of the leg members in the upright, erect position.

31. A device as claimed in claim 30 further including pads of sponge rubber or the like on the underneath sides of the outer ends of said support arms and on said support posts.

32. A triangular traffic signalling device comprising: a triangular body having first, second and third leg members each constituting one leg of a triangle; a plurality of cube corner reflex elements secured to at least one outer surface of said leg members, said plurality of reflector elements including three identical corner reflector elements for defining triangular corners, each of said corner elements having an apex portion and a pair of legs of equal length extending from said apex portion, and three identical elongated reflector elements each extending between the aligned legs and adjacent pair of said corner reflector elements; support arm means pivotally mounted on said first leg member for movement between an active position projecting in opposite directions from said first leg member such that one end of said support arm means is spaced from said first leg member on one side thereof and the other end of said support arm means is spaced from said first leg member on the other side thereof for supporting said triangular body in an upright position on a road surface, and an inactive, stored position in substantial alignment with said first leg member; and a pair of elongated, resilient compressible pads of sponge rubber or the like, each of said pads being mounted on the underneath side of the respective ends of said support arm means and each having a leading end adjacent to the respective ends of said support arm means and extending inwardly from said ends of said support arm means along the length of said support means to a trailing end of said pad for engaging the road surface along the entire length of the pads in the active position of said support arm means; the compressibility of said sponge rubber pads permitting tilting movement of the triangular body in its upright position such that wind forces will tilt the triangular body in its upright position and compress the pad on the end of the support arm means opposite the side thereof against which the wind forces applied an amount that progressively decreases from the leading end thereof to the trailing end thereof so that the entire length of the pad can remain in contact with the road surface upon substantial complete compression of the leading end thereof to provide resistance to sliding movement with respect to the road surface.

33. A foldable triangular traffic signalling device comprising: a collapsible body having first, second and third leg members connected together for movement between an erect triangle forming position in which each leg member constitutes one leg of a triangle and a folded position; said second and third leg members each having an inner end and an outer end with said inner ends being pivotally connected to opposite ends of said first leg member such that each of said second and third leg members is pivotally movable with respect to said first leg member and projects angularly from said first leg member in said erect position and is disposed in substantial parallel relationship with said first leg member in said folded position; inter engaging means near said outer ends of said second and third leg members for detachably securing said outer ends together in said erect position; light reflective means on at least one outer surface of each of said leg members; support arm means pivotally mounted on said first leg member for movement between an active position projecting in opposite directions from said first leg member such that one end of said support arm means is spaced from first leg member on one side thereof and the other end of said support arm means is spaced from said first leg member on the other side thereof for supporting said triangular body in an upright position on a road surface, and an inactive, stored position in substantial alignment with said first leg member; and a pair of elongated, resilient compressible pads of sponge rubber or the like, each of said pads being mounted on the underneath side of the respective ends of support arm means and each having a leading end adjacent the respective ends of said support arm means and extending inwardly from said ends of said support arm means along the length of said support arm means to a trailing end of said pads for engaging the road surface along the entire length of the pads in the active position of said support arm means, the compressibility of said sponge rubber pads permitting tilting movement of the triangular body in its upright position such that wind forces will tilt the triangular body in its upright position and compress the pad on the end of the support arm means opposite the side thereof against which the wind forces applied an amount that progressively decreases from the leading end thereof to the trailing end thereof so that the entire length of the pad can remain in contact with the road surface upon substantial complete compression of the leading end thereof to provide resistance to sliding movement of the erect body with respect to the road surface.

* * * * *